US012676472B2

(12) United States Patent
Saito

(10) Patent No.: US 12,676,472 B2
(45) Date of Patent: Jul. 7, 2026

(54) BATTERY PACK, POWER STORAGE DEVICE, ELECTRIC TOOL, AND ELECTRIC VEHICLE

(71) Applicant: MURATA MANUFACTURING CO., LTD., Kyoto (JP)

(72) Inventor: Keisuke Saito, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 621 days.

(21) Appl. No.: 18/340,198

(22) Filed: Jun. 23, 2023

(65) Prior Publication Data

US 2023/0335986 A1      Oct. 19, 2023

Related U.S. Application Data

(63) Continuation of application No. PCT/JP2022/011684, filed on Mar. 15, 2022.

(30) Foreign Application Priority Data

Mar. 26, 2021     (JP) ................................. 2021-052530

(51) Int. Cl.
| | |
|---|---|
| *H02H 7/18* | (2006.01) |
| *B25F 5/00* | (2006.01) |
| *B60L 3/00* | (2019.01) |
| *H02J 7/50* | (2026.01) |

(52) U.S. Cl.
CPC ................. *H02H 7/18* (2013.01); *H02J 7/50* (2026.01); *B25F 5/00* (2013.01); *B60L 3/0046* (2013.01)

(58) Field of Classification Search
CPC ...... H02H 7/18; H02J 7/50; H02J 7/00; B25F 5/00; B60L 3/0046; Y02E 60/10

USPC ......................................................... 320/135
See application file for complete search history.

(56) References Cited

U.S. PATENT DOCUMENTS

| | | | | |
|---|---|---|---|---|
| 2017/0077810 A1 * | 3/2017 | Goto ..................... | H02M 1/088 |
| 2019/0006964 A1 * | 1/2019 | Kurosawa .......... | G11B 19/2009 |
| 2020/0366286 A1 * | 11/2020 | Yokosyo ............ | H03K 17/0812 |

FOREIGN PATENT DOCUMENTS

| | | |
|---|---|---|
| JP | 2002118957 A | 4/2002 |
| JP | 2010011598 A | 1/2010 |
| JP | 2014236555 A | 12/2014 |

OTHER PUBLICATIONS

International Search Report issued in PCT/JP2022/011684, dated May 24, 2022.

* cited by examiner

*Primary Examiner* — Huy Q Phan
(74) *Attorney, Agent, or Firm* — K&L Gates LLP

(57) ABSTRACT

A discharge control switch is protected against surge voltage. A battery pack is provided in which a discharge control switch is connected to a positive electrode side power line between a positive electrode terminal and a positive electrode output terminal of a battery or a negative electrode side power line between the negative electrode terminal and a negative electrode output terminal of the battery, a reflux portion is connected between the positive electrode side power line and the negative electrode side power line on a side closer to the positive electrode output terminal and the negative electrode output terminal than the discharge control switch, a reflux control signal is output from a control unit to an insulating portion, and a switch unit is switched from off to on based on the reflux control signal.

12 Claims, 8 Drawing Sheets

BATTERY PACK, POWER STORAGE DEVICE, ELECTRIC TOOL, AND ELECTRIC VEHICLE

CROSS REFERENCE TO RELATED APPLICATIONS

The present application is a continuation of PCT patent application no. PCT/JP2022/011684, filed on Mar. 15, 2022, which claims priority to Japanese patent application no. 2021-052530, filed on Mar. 26, 2021, the entire contents of which are incorporated herein by reference.

BACKGROUND

The present application relates to a battery pack, a power storage device, an electric tool, and an electric vehicle.

A battery pack having a lithium ion battery or the like generally has a configuration incorporating a charge/discharge control switch for controlling charge/discharge. The battery pack is connected to a load or a charging device (which hereinafter may be collectively referred to as a load or the like). Here, when the battery pack is connected to a system in which a cable between the battery pack and the load or the like is long and an inductor component is large or an inductive load in which inductance of the load itself is large, the charge/discharge control switch may be broken by a surge current generated by a counter electromotive force when the discharge control switch is switched from on to off. A circuit configuration is provided with a reflux diode as a countermeasure against such a surge current.

SUMMARY

The present application relates to a battery pack, a power storage device, an electric tool, and an electric vehicle.

The technique described in the Background section can be applied only to a configuration in which a switch to be protected is provided on the positive electrode side. In addition, the technique described in the Background section is for protecting a discharge control switch outside a battery pack, and is not for protecting a discharge control switch inside the battery pack. In addition, the technique described in the Background section does not describe the timing of enabling the reflux diode. As described above, the technique described in the Background section is insufficient as a technique for protecting the discharge control switch of the battery pack.

Therefore, the present application relates to providing, in an embodiment, a battery pack, a power storage device, an electric tool, and an electric vehicle that appropriately protect a discharge control switch of the battery pack against a surge voltage.

The present application, in an embodiment, relates to a battery pack including: a battery having a positive electrode terminal and a negative electrode terminal; a discharge control switch; a control unit; a positive electrode output terminal and a negative electrode output terminal; a reflux portion in which a switch unit and a first diode are connected in series; and an insulating portion, wherein the discharge control switch is connected to a positive electrode side power line between the positive electrode terminal and the positive electrode output terminal of the battery or a negative electrode side power line between the negative electrode terminal and the negative electrode output terminal of the battery, the reflux portion is connected between the positive electrode side power line and the negative electrode side power line on a side closer to the positive electrode output terminal and the negative electrode output terminal than the discharge control switch, a reflux control signal is output from the control unit to the insulating portion, and the switch unit is switched from off to on based on the reflux control signal.

According to at least an embodiment of the present application, the discharge control switch of the battery pack can be appropriately protected from the surge voltage. Note that the contents of the present technology are not to be construed as being limited by the effects exemplified in the present specification.

DETAILED DESCRIPTION

The present application will be described below in further detail including with reference to the drawings and examples according to an embodiment. The present application is not limited thereto.

Figure 1:
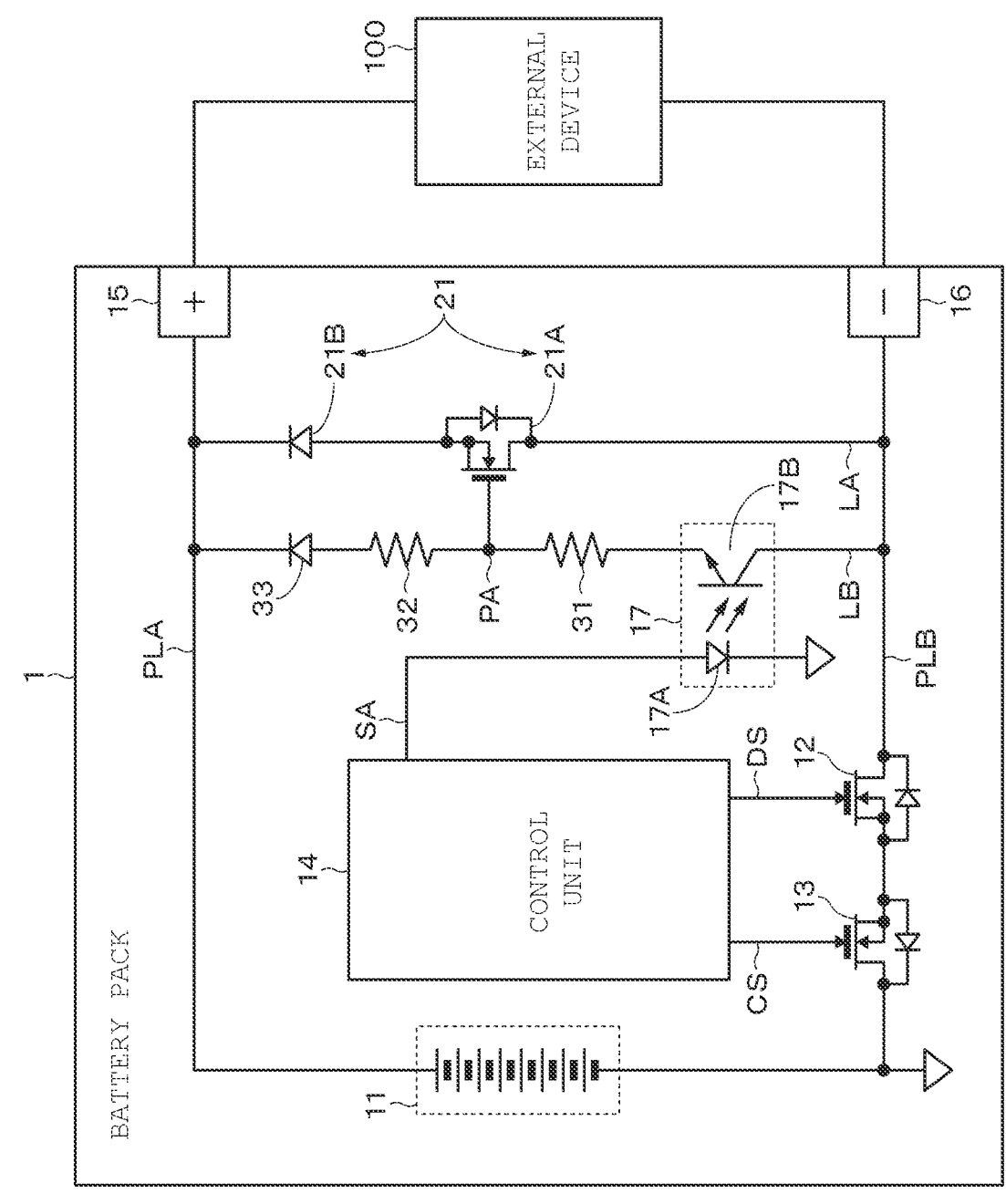
FIG. 1 is a diagram for explaining a configuration example of a battery pack according to an embodiment.

FIG. 1 is a diagram for explaining a configuration example of a battery pack (battery pack 1) according to an embodiment. The battery pack 1 schematically includes a battery 11, a discharge control switch 12, a charge control switch 13, a control unit 14, a positive electrode output terminal 15, a negative electrode output terminal 16, and an insulating portion 17. The battery pack 1 can be connected to an external device 100 through the positive electrode output terminal 15 and the negative electrode output terminal 16. The external device 100 is a load, a charging device, or the like.

The battery 11 is, for example, a lithium ion battery. As the battery 11, a battery other than a lithium ion battery may be applied. The battery 11 has one or more lithium ion battery cells (unit cells). FIG. 1 shows a battery 11 having a configuration in which eight lithium ion battery cells are connected in series. Naturally, the number of lithium ion battery cells included in the battery 11 and the connection mode of the lithium ion battery cells may be appropriately changed. A positive electrode terminal of the battery 11 is connected to the positive electrode output terminal 15 through the positive electrode side power line PLA. The negative electrode terminal of the battery 11 is connected to the negative electrode output terminal 16 through the negative electrode side power line PLB.

The discharge control switch 12 is a switch that controls discharge of the battery pack 1. The discharge control switch 12 includes, for example, a metal oxide semiconductor field effect transistor (MOSFET). A discharge control signal DS is supplied from the control unit 14 to the discharge control switch 12. The discharge control switch 12 is controlled to be turned on/off in accordance with the supply of the discharge control signal DS.

The charge control switch 13 is a switch that controls charging of the battery pack 1. The charge control switch 13 includes, for example, a MOSFET. A charge control signal CS is supplied from the control unit 14 to the charge control switch 13. The charge control switch 13 is controlled to be turned on/off in accordance with the supply of the charge control signal CS.

The control unit 14 is an integrated circuit (IC) that integrally controls the operation of the battery pack 1. The control unit 14 controls discharge and charge in the battery pack 1 by outputting the discharge control signal DS and the charge control signal CS described above. In addition, the control unit 14 outputs the reflux control signal SA to the insulating portion 17. The reflux control signal SA is, for example, a pulse signal of one shot.

The insulating portion 17 includes, for example, a photocoupler. Specifically, the insulating portion 17 includes a light emitting diode 17A and a phototransistor 17B. The light emitting diode 17A is connected to the control unit 14. The light emitting diode 17A emits light in response to the reflux control signal SA supplied from the control unit 14. The light emitting diode 17A emits light to turn on the phototransistor 17B.

The line LA and the line LB are connected in parallel between the positive electrode side power line PLA and the negative electrode side power line PLB on the output side of the discharge control switch 12. Here, the output side of the discharge control switch 12 means a side closer to the positive electrode output terminal 15 and the negative electrode output terminal 16, and in the example of FIG. 1, the output side means a right side to the discharge control switch 12 as viewed in the drawing. The line LA and the line LB respectively located close to the positive electrode output terminal 15 and the negative electrode output terminal 16 are provided between the positive electrode side power line PLA and the negative electrode side power line PLB from the side.

The reflux portion 21 is connected to the line LA. The reflux portion 21 includes a switch unit 21A and a reflux diode 21B corresponding to the first diode in the present embodiment. The switch unit 21A is constituted by, for example, an N-channel MOSFET, a drain of which is connected to the negative electrode side power line PLB, and a source of which is connected to an anode of the reflux diode 21B. A cathode of the reflux diode 21B is connected to the positive electrode side power line PLA. The switch unit 21A is a switch whose on/off is controlled based on the reflux control signal SA, and that enables the operation of the reflux diode 21B. Specifically, the operation of the reflux diode 21B becomes effective by switching the switch unit 21A from off to on based on the reflux control signal SA.

The above-described phototransistor 17B, a resistor 31, a resistor 32, and a diode 33 are connected to the line LB. The diode 33 corresponds to a second diode in the present embodiment. A collector of the phototransistor 17B is connected to negative electrode side power line PLB. An emitter of the phototransistor 17B is connected to one end of the resistor 31, and the other end of the resistor 31 is connected to one end of the resistor 32. The other end of the resistor 32 is connected to the anode of the diode 33, and the cathode of the diode 33 is connected to the positive electrode side power line PLA. In addition, a connection point PA provided between the resistor 31 and the resistor 32 is connected to the gate of the switch unit 21A.

Next, an operation example of the battery pack 1 will be described. The control unit 14 performs a general protection operation. For example, in a case where the control unit 14 determines that the battery 11 has no abnormality and thus can be charged and discharged without any problem, control unit 14 turns on the discharge control switch 12 and the charge control switch 13. In addition, the control unit 14 controls at least the charge control switch 13 to be turned off in a case where it is necessary to prohibit charging, for example, when the voltage of the battery 11 reaches the overcharge prohibition voltage. In addition, the control unit 14 controls at least the discharge control switch 12 to be turned off in a case where it is necessary to prohibit discharging, for example, when the voltage of the battery 11 reaches the overdischarge prohibition voltage. In addition, when the battery 11 is deeply discharged and reaches the recharge inhibition region, the control unit 14 controls the discharge control switch 12 and the charge control switch 13 to be turned off to stop charging and discharging. It is to be noted that the control unit 14 may perform another known protection operation such as an overcurrent detection.

As described above, when the battery pack 1 is connected to a system in which a cable between the battery pack 1 and the external device 100 is long and the inductance component is large or an inductive load in which the inductance of the external device 100 itself is large, the discharge control switch 12 may be broken by a surge voltage generated by a counter electromotive force when the discharge control switch 12 is switched from on to off. Therefore, it is desirable that an appropriate protection operation is performed on the surge voltage.

Based on such a viewpoint, a circuit configuration including a reflux diode is conceivable. However, when the external device 100 is a charging device and the charging device is reversely connected to the battery pack 1 or reversely connected when the battery pack 1 is connected in parallel, a short-circuit current flows through the reflux diode, and the reflux diode itself, the charger, and the battery pack 1 connected in parallel may fail. Generally, the period during which the surge voltage is generated is a short time (within 10 msec) after the discharge control switch 12 is switched from on to off. Therefore, the operation of the reflux diode 21B only needs to be enabled during such a period. In the present embodiment, by providing the switch unit 21A, the operation of the reflux diode 21B can be enabled only during a period in which a surge voltage is considered to be generated. Hereinafter, details of the protective operation against the surge voltage of the battery pack 1 will be described.

The control unit 14 outputs the discharge control signal DS to the discharge control switch 12 in order to stop the power supply to the external device 100. When the discharge control signal DS is supplied, the discharge control switch 12 is switched from on to off, and power supply to the external device 100 is stopped. A surge voltage is generated in response to switching of the discharge control switch 12 from on to off.

Figure 2:
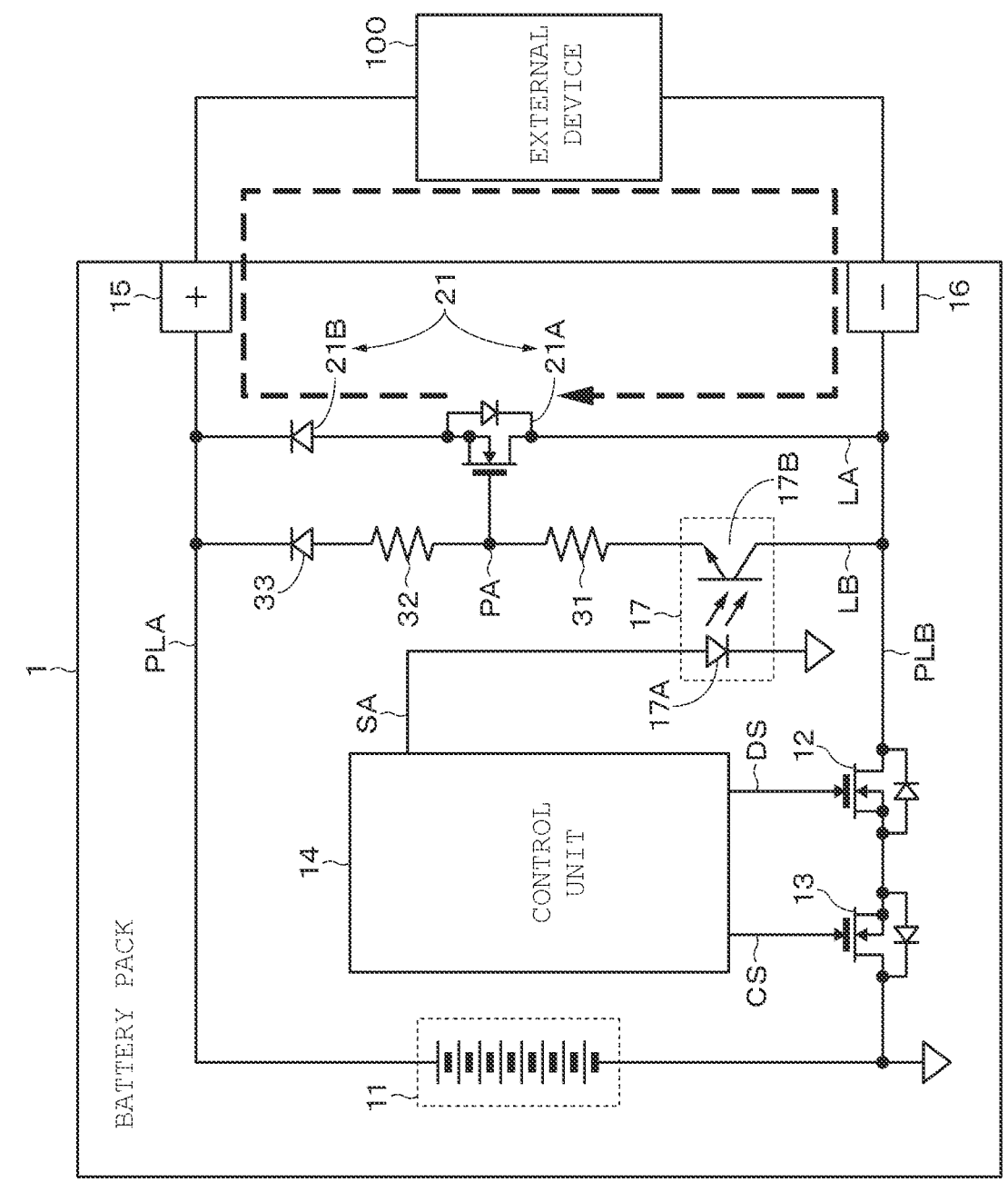
FIG. 2 is a diagram referred to in describing an operation example of the battery pack according to an embodiment.

The control unit 14 outputs the reflux control signal SA to the insulating portion 17 at substantially the same timing as (in synchronization with) the timing at which the discharge control signal DS is output to the discharge control switch 12. The light emitting diode 17A emits light by the reflux control signal SA, and the phototransistor 17B is turned on. When the phototransistor 17B is turned on, the surge voltage is divided by the resistor 31 and the resistor 32, and the divided voltage (a predetermined voltage generated at the connection point PA, specifically, a voltage based on a surge voltage) is input to the gate of the switch unit 21A. As a result, the switch unit 21A is switched from off to on, and the operation of the reflux diode 21B becomes effective. When the operation of the reflux diode 21B is enabled, a reflux path indicated by a dotted arrow in FIG. 2 is formed, and the surge current due to the surge voltage is refluxed to the external device 100 side. This protects the discharge control switch 12.

Figure 3:
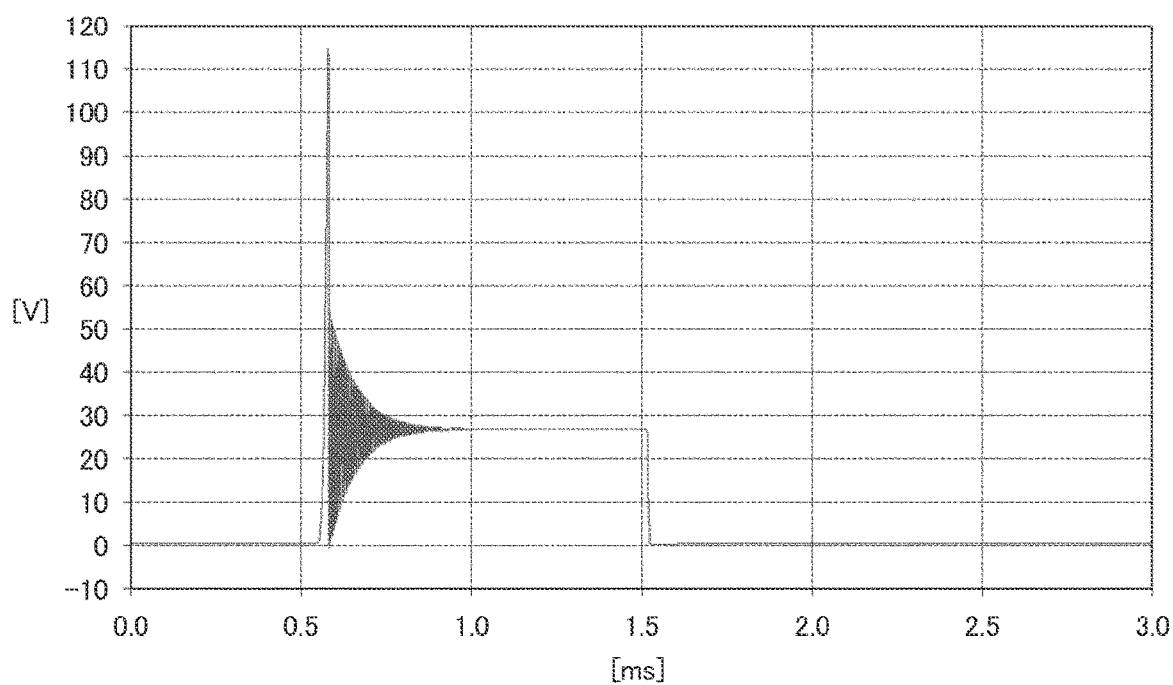
FIG. 3 is a diagram referred to in describing an example of an effect of an embodiment.
Figure 4:
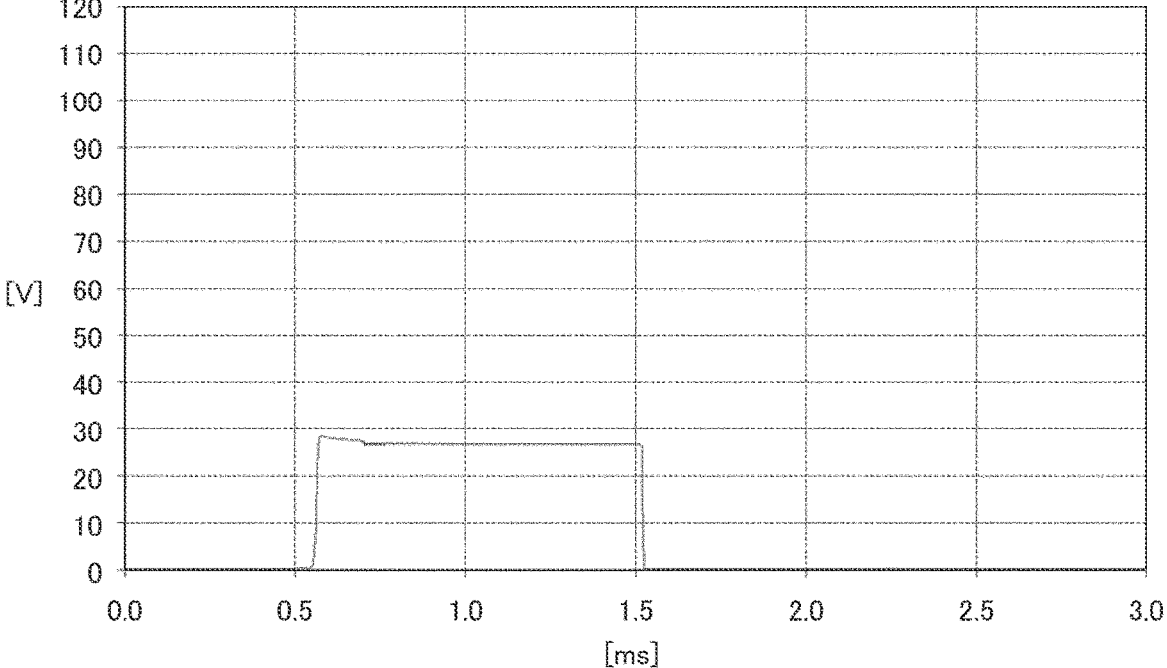
FIG. 4 is a diagram referred to in describing an example of an effect of an embodiment.

According to the present embodiment, the discharge control switch 12 of the battery pack 1 can be appropriately protected from the surge voltage. For example, the voltage to be applied to the discharge control switch 12 has been simulated when the discharge control switch 12 is switched from on to off during discharging at 120A with an inductive load connected as the external device 100 to the 26-V battery pack 1. As a result, as shown in FIG. 3, a surge voltage (about 110 V at the maximum) exceeding the withstand voltage (for example, 60 to 80 V) of the discharge control switch 12 was generated. However, according to the configuration according to the present embodiment, as illustrated in FIG. 4, it has been confirmed that the surge voltage can be suppressed to be smaller than the withstand voltage of the discharge control switch 12.

By using the reflux control signal SA as a pulse signal of one shot and making an output period correspond to a period in which a surge voltage continues to be generated, the switch unit 21A can be kept turned on only during the period in which the surge voltage is generated. In other words, the operation of the reflux diode 21B can be enabled only during the period in which the surge voltage is generated. In general, since most of the surge voltages converge within 0.3 msec, the period during which the reflux control signal SA is output is set to, for example, 0.3 msec or more and 10 msec or less. In a case where the output period of the reflux control signal SA is longer than 10 msec, a short-circuit current may flow through the reflux diode 21B due to an artificial operation such as reverse connection or connection to a charging device, which is not preferable.

When no surge voltage is generated, the operation of the reflux diode 21B can be prevented from being effective. For example, it is assumed that terminals of the charging device are reversely connected between the positive electrode output terminal 15 and the negative electrode output terminal 16 of the battery pack 1, or polarities are reversely connected when the plurality of battery packs 1 are connected in parallel in order to increase the capacity. Also in this case, since the switch unit 21A is turned off, the short-circuit current does not flow to the reflux diode 21B, and the reflux diode 21B can be protected.

With the configuration in which the reflux control signal SA is transmitted through the insulating portion 17, when the discharge control switch 12 is controlled to be turned off and the control unit 14 is disconnected from the ground, the reflux control signal SA output from the control unit 14 can be reliably transmitted. In addition, the operating voltage of the IC such as the control unit 14 is usually a low voltage such as 5 V or 3.3 V. In order to control a high voltage between the positive electrode output terminal 15 and the negative electrode output terminal 16 at this low voltage, a level shift, a protection element of a device, and the like are required, which complicates a circuit configuration. However, in the present embodiment, the potential difference between the control unit 14 and the switch unit 21A can be easily eliminated by insulation by the insulating portion 17.

In the present embodiment, the diode 33 is connected in series to the output side of the insulating portion 17. Such a configuration makes it possible to prevent a reverse voltage from being applied to the output of the insulating portion 17 by the voltage of the battery 11. In addition, the circuit for protecting the discharge control switch 12 from the surge voltage is completed in the battery pack 1, and it is not necessary to add a component to the outside. As a result, the battery pack 1 incorporating the discharge control switch 12 and the charge control switch 13 can be made into a battery pack that can be used for general purposes in various cases where the battery pack 1 is arranged in series or in parallel depending on the capacity, or where the load itself or the wiring length to the load is different.

While the present application has been described above according to an embodiment, the contents of the present application are not to be considered limited thereto, and various modifications may be made.

Figure 5:
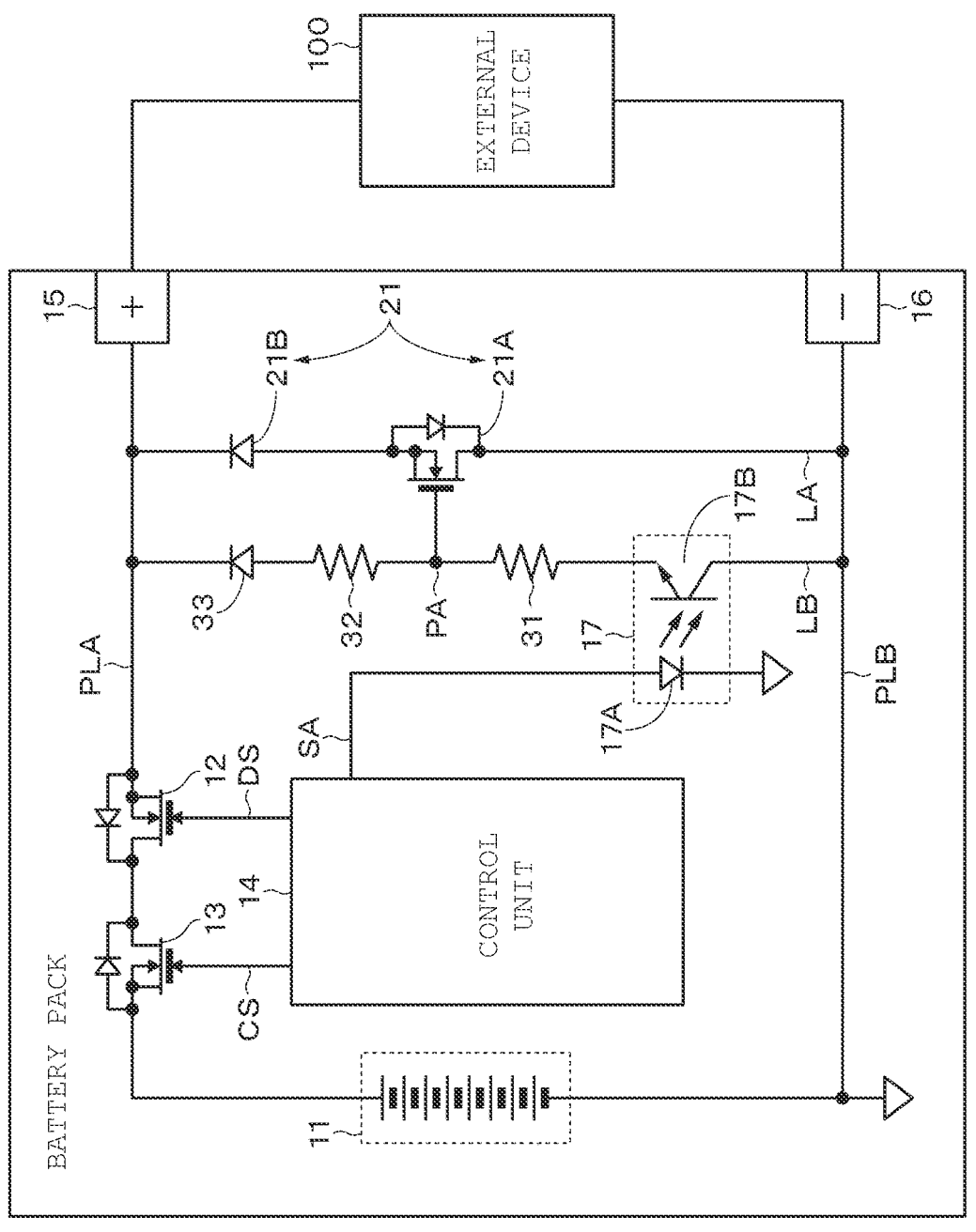
FIG. 5 is a diagram illustrating a modification example of the battery pack according to an embodiment.

Connection positions of the discharge control switch 12 and the charge control switch 13 may be appropriately changed. For example, as shown in FIG. 5, the discharge control switch 12 and the charge control switch 13 may be connected to the positive electrode side power line PLA. In addition, the discharge control switch 12 may be connected to the positive electrode side power line PLA, and the charge control switch 13 may be connected to the negative electrode side power line PLB. In addition, the discharge control switch 12 may be connected to the negative electrode side power line PLB, and the charge control switch 13 may be connected to the positive electrode side power line PLA. As described above, the connection position of the discharge control switch 12 is not limited to a specific polarity side.

Figure 6:
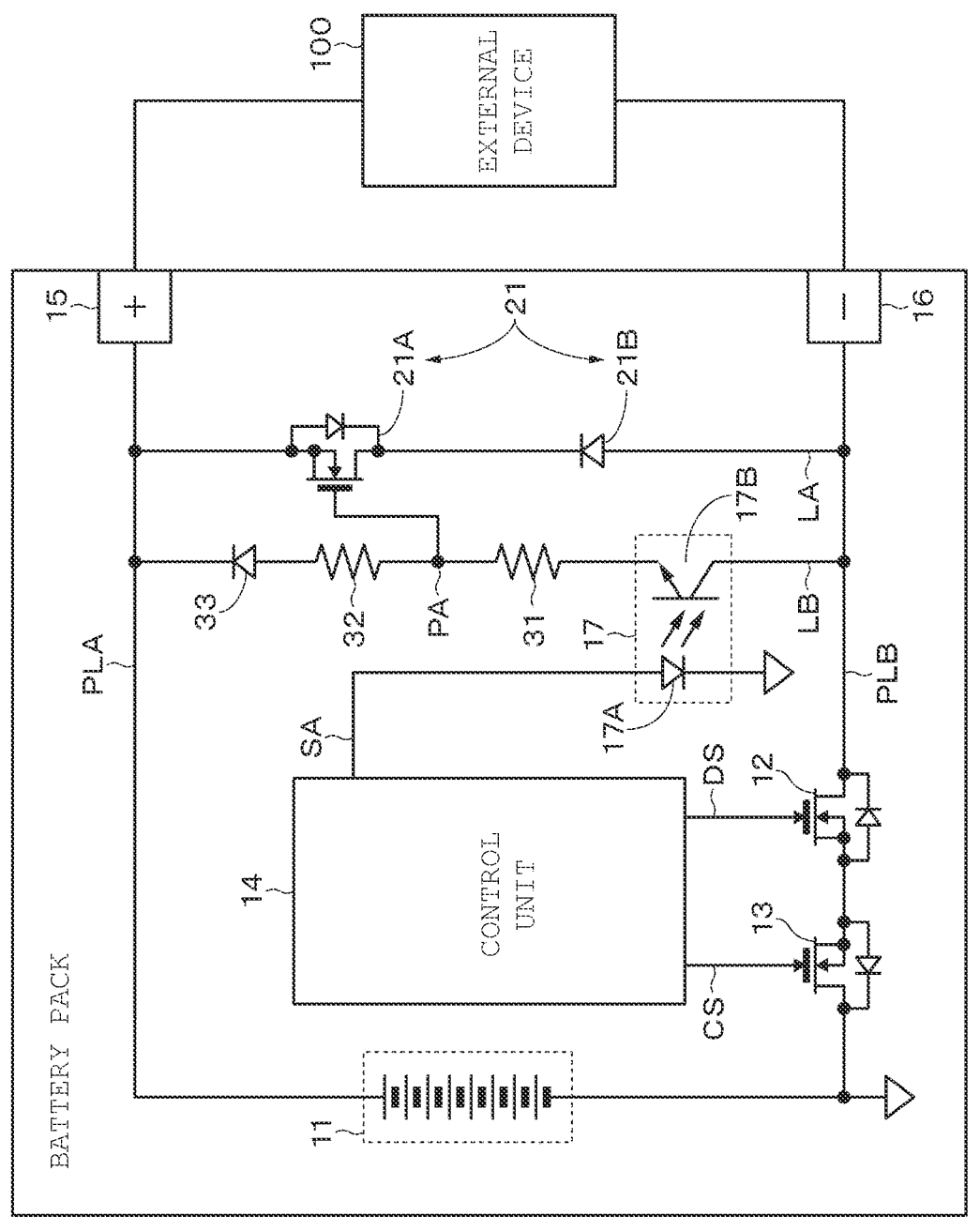
FIG. 6 is a diagram illustrating a modification example of the battery pack according to an embodiment.

As illustrated in FIG. 6, the connection positions of the switch unit 21A and the reflux diode 21B may be switched. Specifically, the source of the switch unit 21A is connected to the positive electrode side power line PLA. In addition, the cathode of the reflux diode 21B is connected to the drain of the switch unit 21A, and the anode of the reflux diode 21B is connected to the negative electrode side power line PLB.

In charging, unlike a discharge control switch that cuts off a large current such as an inrush current due to a short circuit or a capacitive load, as large a current as discharge is not cut off. Therefore, a counter electromotive force that destroys the discharge control switch and the charge control switch is less likely to be generated. Therefore, in the above-described embodiment, the protection operation for the charge control switch and the like is not performed at the time of interruption of charging. However, this does not exclude that the same operation as in the embodiment is performed when the charging is interrupted (when the charge control switch is turned off).

In the above-described embodiment, an N-channel MOSFET is used as the switch unit 21A, but a P-channel MOSFET may also be used. However, from the viewpoint of cost, withstand voltage, a number of types, and the like, N-channel MOSFETs are preferably used according to an embodiment.

In the above-described embodiment, the insulating portion is not limited to the photocoupler, and may be a photo relay or the like.

In the above-described embodiment, an example has been described in which the other end of the resistor 32 is connected to the anode of the diode 33 and the cathode of the diode 33 is connected to the positive electrode side power line PLA. However, the diode 33 may be removed, and the other end of the resistor 32 may be connected to the anode of the reflux diode 21B. In this case, the circuit configuration can be simplified by using the reflux diode 21B also as the function of the diode 33.

The matters described in the above-described embodiment including modified examples can be appropriately combined. In addition, the materials, processes, and the like described in the embodiments are considered merely by way of example, and the contents of the present application are not to be considered limited thereto.

Next, application examples of the present application will be described according to an embodiment. The present application is not limited thereto.

For example, the battery pack according to can be applied to a power storage device. The power storage device includes a plurality of battery packs, and the plurality of battery packs are connected to each other. The plurality of battery packs may be connected in series, in parallel, or in series and parallel. The power storage device is used as, for example, power storage modules for commercial use or household use, and power supplies for electric power storage use for a building such as a house, a building, or an office, or for a power-generating facility.

The battery pack described herein can be mounted on devices such as electronic devices and electrical transportation devices, and can be used to supply electric power to those devices.

Examples of the electronic devices include notebook computers, smartphones, tablet terminals, PDAs (personal digital assistants), mobile phones, wearable terminals, digital still cameras, electronic books, music players, game machines, hearing aids, electric tools, televisions, lighting devices, toys, medical devices, and robots.

Examples of the electric transportation device include electric vehicles (including hybrid vehicles), electric motorcycles, electric assisted bicycles, electric buses, electric carts, automatic guided vehicles (AGV), and railway vehicles. In addition, an electric passenger aircraft and an electric unmanned aircraft for transportation are also included. The battery pack is used not only as these driving power supplies but also as an auxiliary power supply, a power supply for recovering a regenerated energy, and other power supplies.

Figure 7:
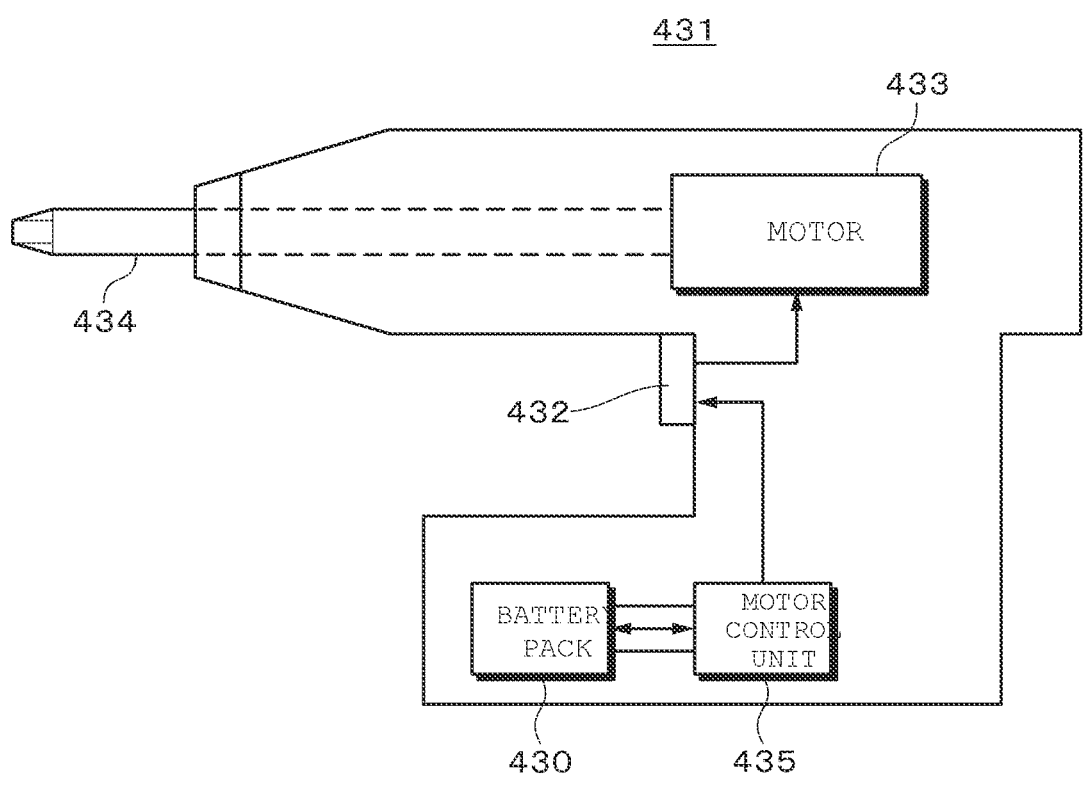
FIG. 7 is a diagram illustrating an application example of an embodiment.

An example of an electric driver as an electric tool to which the present technology can be applied will be schematically described with reference to FIG. 7. An electric driver 431 is provided with a motor 433 that transmits rotational power to a shaft 434 and a trigger switch 432 operated by a user. A battery pack 430 and a motor control unit 435 are housed in a lower housing of a handle of the electric driver 431. The battery pack 430 is built in the electric driver 431 or is detachable. The battery pack may be applied as the battery pack 430.

Each of the battery pack 430 and the motor control unit 435 may be provided with a microcomputer (not illustrated) so that charge/discharge information of the battery pack 430 can be exchanged. The motor control unit 435 can control operation of the motor 433 and cut off power supply to the motor 433 at the time of abnormality such as overdischarge.

Figure 8:
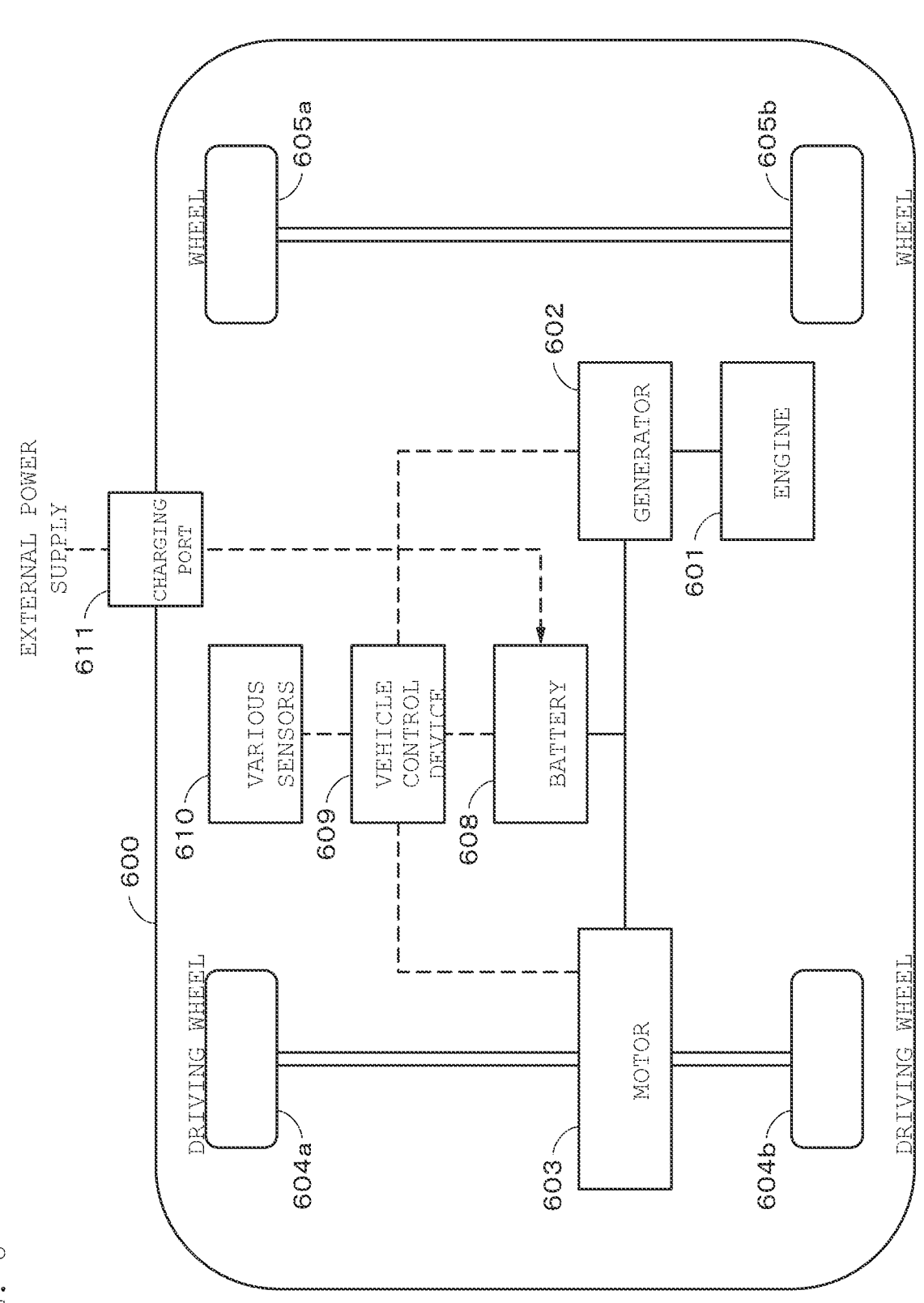
FIG. 8 is a diagram illustrating an application example of an embodiment.

As an example in which the present technology is applied to an electric vehicle power storage system, a configuration example of a hybrid vehicle (HV) employing a series hybrid system is schematically shown in FIG. 8. The series hybrid system is a car travelling with an electric power-driving force conversion device using electric power generated by a generator powered by an engine or electric power obtained by temporarily storing the generated electric power in a battery.

A hybrid vehicle 600 is mounted with an engine 601, a generator 602, a motor which is a direct-current motor or alternate-current motor (hereinafter, referred to simply as a "motor 603"), a driving wheel 604a, a driving wheel 604b, a wheel 605a, a wheel 605b, a battery 608, a vehicle control device 609, various sensors 610, and a charging port 611. As the battery 608, the battery pack or a power storage module on which a plurality of the battery packs are mounted may be applied.

The motor 603 is operated by the electric power of the battery 608, and a rotating force of the motor 603 is transmitted to the driving wheels 604a and 604b. The battery 608 may store the electric power generated at the generator 602 by the rotational force produced by the engine 601. The various sensors 610 control an engine speed using the vehicle control device 609, or control an opening degree of a throttle valve, not illustrated.

When the hybrid vehicle 600 is decelerated by a brake mechanism, not illustrated, a resistance force during the deceleration is added as a rotating force to the motor 603, and regenerative electric power generated due to this rotating force is stored in the battery 608. In addition, the battery 608 may be charged by being connected to an external power supply through the charging port 611 of the hybrid vehicle 600. Such an HV vehicle is referred to as a plug-in hybrid vehicle (PHV or PHEV).

The battery pack may also be used as a power supply of a tire pressure monitoring system (TPMS) built in wheels 604 and 605.

Although a series hybrid vehicle has been described above as an example, the present technology is also applicable to a hybrid vehicle of a parallel system using an engine and a motor together or a hybrid vehicle in which a series system and a parallel system are combined. In addition, the present technology is also applicable to an electric vehicle (EV or BEV) and a fuel cell vehicle (FCV) that travel merely by a drive motor without using an engine.

DESCRIPTION OF REFERENCE SYMBOLS

1: Battery pack
11: Battery
12: Discharge control switch
14: Control unit
15: Positive electrode output terminal
16: Negative electrode output terminal
17: Insulating portion
17A: Photodiode
17B: Phototransistor
21: Reflux portion
21A: Switch unit
21B: Reflux diode
33: Diode
PLA: Positive electrode side power line
PLB: Negative electrode side power line
PA: Connection point
DS: Discharge control signal
SA: Reflux control signal It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:

a battery having a positive electrode terminal and a negative electrode terminal;

a discharge control switch;

a control unit;

a positive electrode output terminal and a negative electrode output terminal;

a reflux portion in which a switch unit and a first diode are connected in series; and an insulating portion, wherein the discharge control switch is connected to a positive electrode side power line between the positive electrode terminal and the positive electrode output terminal of the battery or a negative electrode side power line between the negative electrode terminal and the negative electrode output terminal of the battery, the reflux portion is connected between the positive electrode side power line and the negative electrode side power line on a side closer to the positive electrode output terminal and the negative electrode output terminal than the discharge control switch, a reflux control signal is output from the control unit to the insulating portion, and the switch unit is switched from off to on based on the reflux control signal.

2. The battery pack according to claim 1, wherein the reflux control signal is output from the control unit to the insulating portion at a same timing as a discharge control signal for controlling the discharge control switch from on to off.

3. The battery pack according to claim 2, wherein when a predetermined voltage is applied to the switch unit in response to the reflux control signal being output from the control unit to the insulating portion, the switch unit is switched from off to on.

4. The battery pack according to claim 3, wherein the predetermined voltage is a voltage based on a surge voltage generated when the discharge control switch is switched from on to off.

5. The battery pack according to claim 1, wherein the reflux control signal is a pulse signal of one shot.

6. The battery pack according to claim 1, wherein the control unit outputs the reflux control signal for a set time.

7. The battery pack according to claim 6, wherein the set time is 0.3 msec or more and 10 msec or less.

8. The battery pack according to claim 1, wherein the insulating portion is a photocoupler.

9. The battery pack according to claim 8, wherein the insulating portion includes a phototransistor, and a second diode is connected in series between the phototransistor and the positive electrode side power line.

10. A power storage device comprising a plurality of the battery packs according to claim 1, wherein the plurality of the battery packs are connected.

11. An electric tool comprising the battery pack according to claim 1.

12. An electric vehicle comprising the battery pack according to claim 1.

* * * * *